US008622666B2

(12) United States Patent
Kozak

(10) Patent No.: US 8,622,666 B2
(45) Date of Patent: Jan. 7, 2014

(54) ADJUSTABLE STEP DRILL BIT

(75) Inventor: Ira Kozak, Riverwoods, IL (US)

(73) Assignee: Combined Producers Co. #1 Inc., Chicago, IL (US)

( * ) Notice: Subject to any disclaimer, the term of this patent is extended or adjusted under 35 U.S.C. 154(b) by 1015 days.

(21) Appl. No.: 12/539,445

(22) Filed: Aug. 11, 2009

(65) Prior Publication Data
US 2011/0038679 A1 Feb. 17, 2011

(51) Int. Cl.
B23B 51/02 (2006.01)

(52) U.S. Cl.
USPC .......................................... 408/225; 408/224

(58) Field of Classification Search
USPC ................................................. 408/224, 225
IPC ....................................................... B23B 51/02
See application file for complete search history.

(56) References Cited

U.S. PATENT DOCUMENTS

| 277,859 | A | | 5/1883 | Welles | |
|---|---|---|---|---|---|
| 843,832 | A | | 2/1907 | Lingol | |
| 1,348,115 | A | * | 7/1920 | Hutchinson | 408/224 |
| 1,652,283 | A | * | 12/1927 | Lewis Roy J | 408/241 R |
| 1,701,427 | A | | 2/1929 | Shields | |
| 1,819,949 | A | | 8/1931 | Cornelius | |
| 2,212,753 | A | * | 8/1940 | Flater al. | 408/217 |
| 2,618,990 | A | * | 11/1952 | Briney, Jr. | 408/188 |
| 2,643,692 | A | | 6/1953 | O'Brien | |
| 2,897,696 | A | * | 8/1959 | Tisserant | 408/225 |
| 3,395,435 | A | * | 8/1968 | Bremer | 407/30 |
| 3,495,483 | A | * | 2/1970 | Janik | 408/211 |
| 3,564,945 | A | * | 2/1971 | Bradley | 408/224 |
| 3,577,809 | A | * | 5/1971 | Brandl et al. | 408/186 |
| 3,659,659 | A | * | 5/1972 | Lichte | 175/53 |
| 3,758,222 | A | | 9/1973 | Oakes | |
| 4,127,355 | A | * | 11/1978 | Oakes | 408/225 |
| 4,189,266 | A | * | 2/1980 | Koslow | 408/224 |
| 4,561,812 | A | | 12/1985 | Linden | |
| 4,580,934 | A | | 4/1986 | McCormick | |
| 4,582,458 | A | * | 4/1986 | Korb et al. | 408/224 |
| 4,720,219 | A | | 1/1988 | Masonek et al. | |
| 4,975,001 | A | | 12/1990 | Rabo et al. | |
| 5,013,193 | A | | 5/1991 | Rabo et al. | |
| 5,184,926 | A | * | 2/1993 | Hemmings | 408/226 |
| 5,326,196 | A | | 7/1994 | Noll | |
| 5,915,893 | A | * | 6/1999 | Miyanaga | 408/202 |
| 6,065,909 | A | | 5/2000 | Cook | |
| 8,231,314 | B2 | * | 7/2012 | Durand | 408/188 |
| 8,388,280 | B1 | * | 3/2013 | Ison et al. | 408/224 |

FOREIGN PATENT DOCUMENTS

| FR | 1080865 | A1 | 12/1954 |
|---|---|---|---|
| GB | 1037991 | B1 | 8/1966 |
| GB | 2171747 | A | 9/1986 |
| JP | 09323209 | A * | 12/1997 |

OTHER PUBLICATIONS

European Patent Application No. 10008314.6-1262, EPO Search Report mailed Dec. 2, 2010.

* cited by examiner

Primary Examiner — David Bryant
Assistant Examiner — Jason L Vaughan
(74) Attorney, Agent, or Firm — Factor Intellectual Property Law Group

(57) ABSTRACT

An adjustable step drill bit with a plurality of cutting disks held in compression on a shaft between two stops. The cutting disks may be arranged in various configurations. Spacers may also be provided on the shaft with the cutting disks. A method of drilling a hole utilizing the drill bit to drill a pilot hole and allowing for the drill bit to be used in a pulling technique.

14 Claims, 2 Drawing Sheets

ADJUSTABLE STEP DRILL BIT

RELATED APPLICATIONS

None.

TECHNICAL FIELD

The present invention relates generally to step drill bits for drilling holes in wood, metal and the like.

BACKGROUND

Step drill bits are used to drill generally larger holes in a work piece that may be a material such as wood and metal. The step drill bits typically have a series of steps, or cutting disks, that increase in diameter from the tip of the bit to the back end of the bit. This allows the step drill bit to cut and drill successively larger holes in the work piece, until the desired sized of the hole is achieved.

These types of bits, step drill bits, are generally more efficient for a user when compared with other types of bits because they do not require a pilot hole to be drilled first. Rather, the tip of the step drill bit acts to drill the first hole, and the successive steps gradually increase the diameter of the hole. This is advantageous in that it does not require a user to continuously replace drill bits with progressively larger drill bits until the hole in the work piece is the desired size. Moreover, this configuration and lack of changing bits may create a straighter hole with less chance that a bit is used to drill at an incorrect angle. Thus, a step drill bit is advantageous and useful for drilling holes.

BRIEF SUMMARY

The present invention provides an adjustable step drill bit for drilling holes of various sizes that generally includes a first stop disposed on a shaft. The first stop may be a drill tip. The shaft generally has a shank portion disposed adjacent the first stop, a threaded portion disposed adjacent the shank portion and an engagement portion disposed adjacent the threaded portion. The adjustable drill bit also includes a plurality of cutting disks disposed on the shank. In addition, a second stop is rotatably received on the threaded portion of the shaft such that the cutting disks are held in compression between the first stop and the second stop.

It is contemplated that the second stop comprises a nut.

It is further contemplated that at least one spacer is disposed between two cutting disks.

It is also contemplated that the shank portion has a keyed shaft and that each cutting disk has a channel configured complementary to the keyed shaft.

The engagement portion may include a cross section such as a hexagonal shape, a cylindrical shape, a non-cylindrical shape, and a square shape.

It is further contemplated that a safety cap be disposed over the drill tip.

In an embodiment of the invention the cutting disks each include a diameter and the cutting disks are configured from the first stop such that the diameters of the cutting disk progressively increase.

In another embodiment of the invention, the cutting disks each include a diameter and the cutting disks are configured from the second stop such that the diameters of the cutting disk progressively increase.

It is further contemplated that the drill tip be integrally formed to the shaft.

In addition to providing the benefits of a typical step drill bit, a step drill bit according to the present invention provides numerous advantageous for a user. For example, a step drill bit according to the present invention will allow a user to select only those cutting disks that are necessary to drill the hole that is needed. This is beneficial because it may avoid the situation where a user's step drill bit is too large for the hole needed (which would create to large of a hole). Rather, a user would be able to configure the step drill bit to drill the required hole size.

In addition, a step drill bit according to the present invention will allow a user to use the shaft and the drill tip to drill a pilot hole and then arrange the cutting disks in a configuration that will allow the step drill bit to be used with a pulling technique.

Furthermore, a step drill bit according to the present invention can be used for drilling especially thick work pieces. The inclusion of the spacers, along with the user's ability to configure the workpiece, may allow for the step drill bit to be used in especially thick work pieces where typical step drill bits may not be as useful.

In addition to the above, the present invention provides a method of drilling a hole in a work piece. The method generally includes the steps of drilling a pilot hole with a drill bit according to the present invention, arranging a plurality of cutting disks on the drill bit, inserting the drill bit through the pilot hole, providing a rotary force to the drill bit, and, pulling the drill bit.

The method may also include the step arranging at least one spacer on the drill bit.

These advantages and others should be readily apparent to those of skill in the art based upon the attached detailed description and drawings.

BRIEF DESCRIPTION OF THE SEVERAL VIEWS OF THE DRAWINGS

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION

Figure 1:
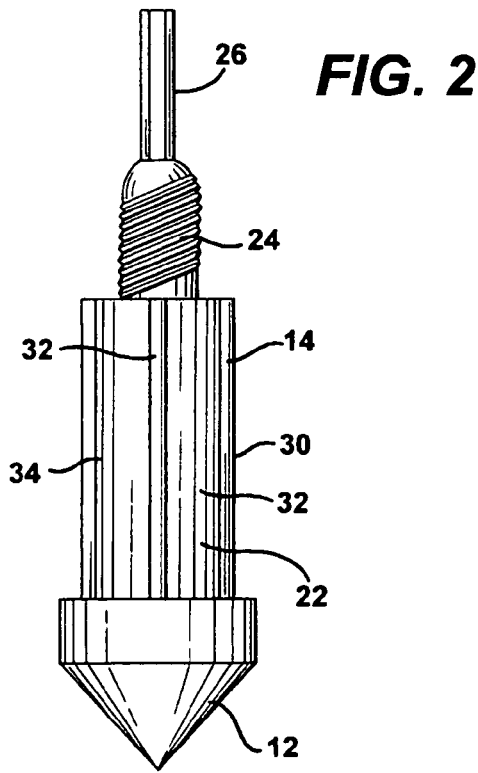
FIG. 1 is a front view of an embodiment of a drill bit according to the present invention.
Figure 2:
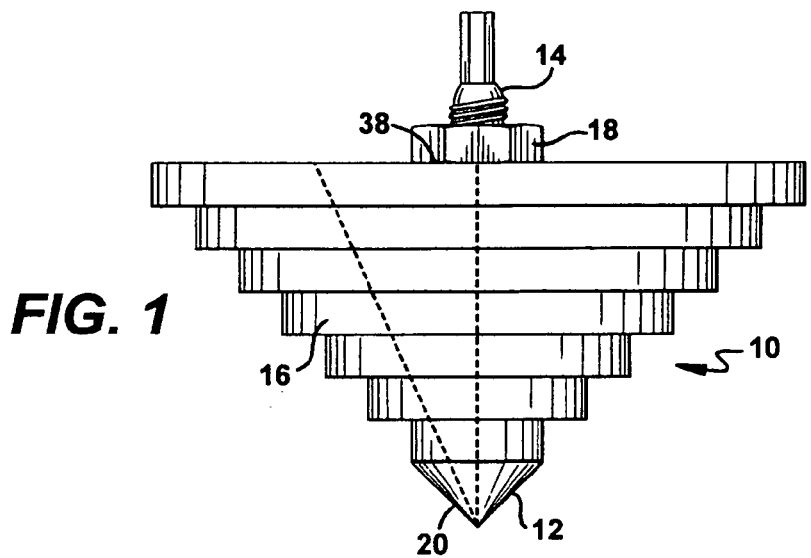
FIG. 2 is a front view of a shaft of a drill bit according to the present invention.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

With reference to the accompanying Figures, an adjustable drill bit 10 according to the present invention includes a first stop 12, a shaft 14, a plurality of cutting disks 16, and a second stop 18.

The first stop 12 is disposed on the shaft 14 and it may be integrally formed therewith. The first stop 12 may be a drill tip 20. Since the first stop 12 maybe be a drill tip 20, a user may not need to drill a pilot hole with a separate drill bit. Rather, the drill tip 20 will act to drill and create the pilot hole in the work piece.

The shaft 14 generally has a shank portion 22 disposed adjacent the first stop 12, a threaded portion 24 disposed adjacent the shank portion 22 and an engagement portion 26 disposed adjacent the threaded portion 24. The engagement portion 26 may have a cross sectional shape such as a hexagonal shape, a cylindrical shape, a non-cylindrical shape, and a square shape. The engagement portion 26 is intended to be inserted into a device capable of providing rotary motion to the drill bit 10, such as a hand drill or a drill press.

Figure 3:
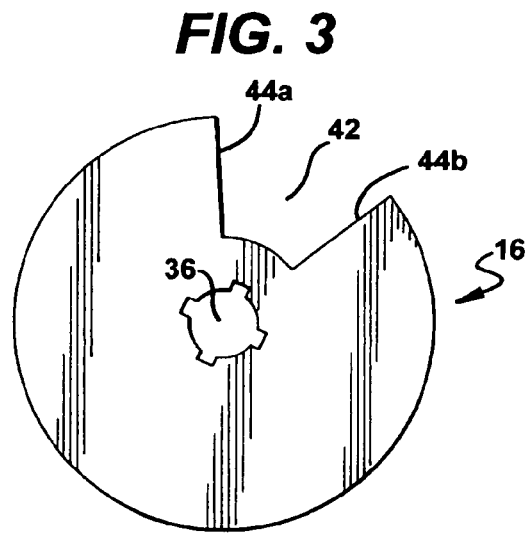
FIG. 3 is a top view of a cutting disk used with a drill bit according to the present invention.
Figure 3A:
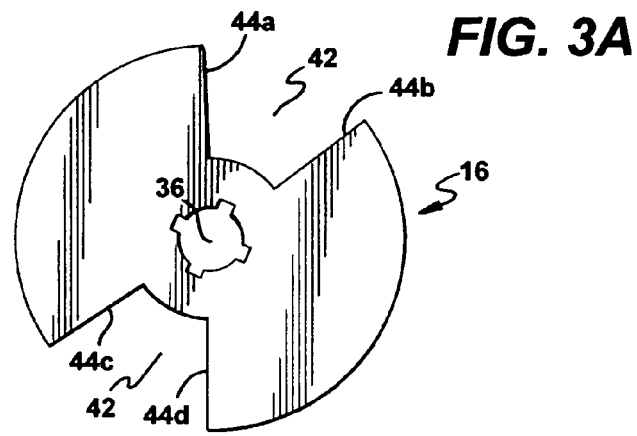
FIG. 3A is a top view of an alternate embodiment of a cutting disk used with a drill bit according to the present invention.

The cutting disks 16 are disposed on the shank portion 22 of the shaft 14. A cutting disk 16 may be generally circular and have a wedged shaped cut out portion 42. The wedged shaped cut out portion 42 creates two cutting surfaces 44a, 44b that allow the drill bit 10 to be used to drill in either a clockwise or counterclockwise direction of rotation. Alternately, as shown in FIG. 3A, the cutting disk 16, may include two wedged shaped cut out portions 42, which create four cutting surfaces 44a, 44b, 44c, 44d.

Figure 4:
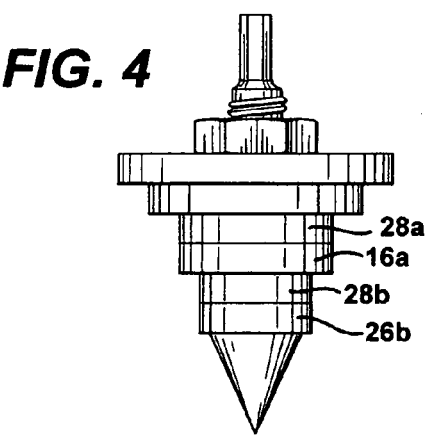
FIG. 4 is a front view of another embodiment of a drill bit according to the present invention.

In addition to cutting disks 16, spacers 28 may be disposed on the shank portion 22. A spacer 28 may be a cutting disk 16 that is the same size as a cutting disk 16 adjacent thereto. As shown in FIG. 4, spacer 28a is the same size as cutting disk 16a and spacer 28b is the same size as cutting disk 16b. The spacer 28 may be used when needed for particularly thick work pieces.

In order to transfer the rotational force from the shaft 14 to the cutting disks 16, it is preferred that the shank portion 22 of the shaft 14 be a keyed shank portion 30. One example may be a generally circular shaped keyed shank portion 32 with four ridges 34 located on the circumference of the circular shaped keyed shank portion 32. The cutting disk 16 may include a channel 36 configured complementary to the circular shaped keyed shank portion 32 of the shaft 14.

The second stop 18 is rotatably received on the threaded portion 24 of the shaft 14 such that the cutting disks 16 are held in compression between the first stop 12 and the second stop 18. The second stop 18 may comprise a nut 38. Utilizing a second stop 18 that is rotatably received on the shaft 14 allows the user to configure the drill bit 10 in a configuration that meets the user's particular needs. Since the second stop 18 is rotatably received, a user can arrange the cutting disk 16 on the shaft 14 and then tighten the second stop 18. The cutting disks 16 will be held in compression between the first stop 12 and the second stop 18.

As shown in FIG. 1, in one possible configuration the cutting disks 16 each include a diameter and the cutting disks 16 are configured from the first stop 12 such that the diameters of the cutting disk 16 progressively increase.

As shown in FIG. 4, in another possible configuration, a user may modify the configuration shown in FIG. 1 with spacers 28.

Figure 5:
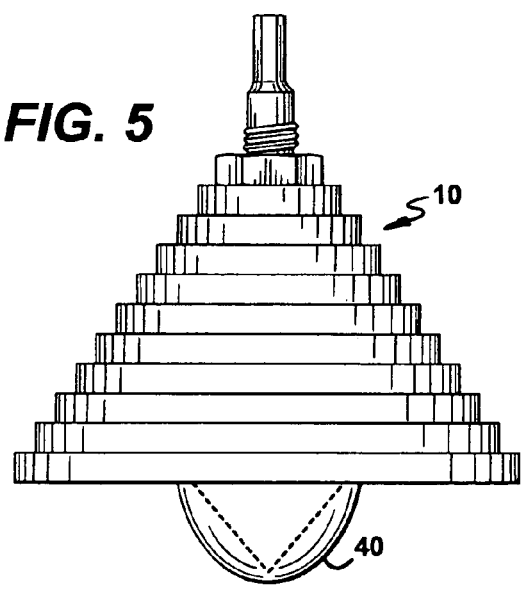
FIG. 5 is a front view of another embodiment of a drill bit according to the present invention.

As shown in FIG. 5, in another potential configuration of the drill bit 10, the cutting disks 16 each include a diameter and the cutting disks 16 are configured from the second stop 18 such that the diameters of the cutting disk 16 progressively increase. In other words, relative to the drill tip 12, the diameters of the cutting disks 16 progressively decrease. In this type of configuration, it is contemplated that a safety cap 40 be disposed over the drill tip 20.

This last configuration is believed to be beneficial where it is desired to drill with a pulling technique. The user may use the drill bit 10 without any cutting disks 16 to drill a pilot hole in the work piece. Subsequently, the user arranges the drill bit 10 with the appropriate configuration of cutting disks 16 and/or spacers 28. Then the drill bit 10 may be inserted through the pilot hole. The user may then attach the engagement portion 26 to a tool designed to impart a rotational force, such as a drill, or a drill press. The drill bit 10 may then be pulled through the pilot hole.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure provided herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An adjustable drill bit for drilling holes of various sizes, the drill bit comprising:
   a first stop disposed on a shaft, the first stop comprising a drill tip,
   wherein the shaft comprises a non-threaded shank portion disposed adjacent the first stop, a threaded portion disposed adjacent the shank portion and an engagement portion disposed adjacent the threaded portion;
   wherein the non-threaded shank portion is located between the drill tip and the threaded portion and wherein the threaded portion is located between the non-threaded shank portion and the engagement portion;
   a plurality of cutting disks disposed on the a non-threaded shank portion, each cutting disk having a cut out portion with a first cutting surface and a second cutting surface, each first cutting surface configured to cut only when the drill bit is rotated in a clockwise direction, and each second cutting surface configured to cut only when the drill bit is rotated in a counter-clockwise direction; and
   a second stop rotatably received on the threaded portion of the shaft such that the cutting disks are held in compression between the first stop and the second stop.

2. The adjustable drill bit of claim 1 wherein the second stop comprises a nut.

3. The adjustable drill bit of claim 1 further comprising at least one spacer disposed between two cutting disks from the plurality of cutting disks.

4. The adjustable drill bit of claim 1 further comprising that the non-threaded shank portion having a keyed shaft.

5. The adjustable drill bit of claim 4 further comprising each cutting disk having a channel configured complementary to the keyed shaft.

6. The adjustable drill bit of claim 1 wherein the engagement portion has a cross section selected from the group consisting of: a hexagonal shape, a cylindrical shape, a non-cylindrical shape, and a square shape.

7. The adjustable drill bit of claim 1 further comprising a safety cap disposed over the drill tip.

8. The adjustable drill bit of claim 1 wherein the cutting disks each include a diameter and the cutting disks are configured from the first stop such that the diameters of the cutting disk progressively increase.

9. The adjustable drill bit of claim 8 further comprising at least one spacer disposed between two cutting disks.

10. The adjustable drill bit of claim 1 wherein the cutting disks each include a diameter and the cutting disks are configured from the second stop such that the diameters of the cutting disk progressively increase.

11. The adjustable drill bit of claim 10 further comprising at least one spacer disposed between two cutting disks.

12. The adjustable drill bit of claim 1 wherein the drill tip is integrally formed to the shaft.

13. The device of claim 1, wherein each cut out portion is wedge shaped.

14. The device of claim 1, wherein each cutting disk includes a second cut out portion with a first cutting surface and a second cutting surface, each first cutting surface configured to cut only when the drill bit is rotated in a clockwise direction, and each second cutting surface configured to cut only when the drill bit is rotated in a counter-clockwise direction.

* * * * *